US 009489421B2

(12) United States Patent
Yamagishi

(10) Patent No.: US 9,489,421 B2
(45) Date of Patent: Nov. 8, 2016

(54) TRANSMISSION APPARATUS, INFORMATION PROCESSING METHOD, PROGRAM, RECEPTION APPARATUS, AND APPLICATION-COORDINATED SYSTEM

(71) Applicant: Sony Corporation, Minato-ku (JP)

(72) Inventor: Yasuaki Yamagishi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 622 days.

(21) Appl. No.: 13/937,684

(22) Filed: Jul. 9, 2013

(65) Prior Publication Data
US 2014/0019474 A1    Jan. 16, 2014

Related U.S. Application Data

(60) Provisional application No. 61/670,900, filed on Jul. 12, 2012.

(51) Int. Cl.
*G06F 17/30* (2006.01)
*H04N 21/44* (2011.01)
(Continued)

(52) U.S. Cl.
CPC ... *G06F 17/30424* (2013.01); *G06F 17/30784* (2013.01); *H04N 21/44008* (2013.01); *H04N 21/8173* (2013.01); *H04N 21/8358* (2013.01); *H04N 21/8547* (2013.01)

(58) Field of Classification Search
CPC ............. G06F 17/30424; G06F 17/30784; H04N 21/44008; H04N 21/8358; H04N 21/8173; H04N 21/8547
USPC ........................................................ 707/769
See application file for complete search history.

(56) References Cited

U.S. PATENT DOCUMENTS 5,664,227 A * 9/1997 Mauldin .......... G06F 17/30843
                                                707/E17.028
6,184,877 B1 * 2/2001 Dodson .............. H04N 5/44543
                                                        348/564
(Continued)

FOREIGN PATENT DOCUMENTS

CA      2 814 197 A1    5/2012
JP     2002-209204 A    7/2002
JP     2007-116211 A    5/2007

OTHER PUBLICATIONS

Hu, Weiming, et al., "A Survey on Visual Content-Based Video Indexing and Retrieval", IEEE Transactions on Systems, Man, and Cybernetics—Part C: Applications and Reviews, vol. 41, No. 6, Nov. 2011, pp. 797-819.*

(Continued)

*Primary Examiner* — Robert Stevens
(74) *Attorney, Agent, or Firm* — Oblon, McClelland, Maier & Neustadt, L.L.P.

(57) ABSTRACT

Disclosed herein is a transmission apparatus including: at least one content recognition section; and a timeline data generation section. The content recognition section has a database block configured to store reference data including at least signature data and a content identifier, and timeline data including at least an application identifier and timeline information. The content recognition section further has a response generation block configured to recognize content from which signature data included in a query, generate a response including the timeline data including a content identifier and the application identifier, and return the generated response to the reception apparatus. The timeline data generation section is configured to generate the timeline data and collectively supply the generated timeline data to the at least one content recognition section, the generated timeline data being common to the at least one content recognition section.

11 Claims, 12 Drawing Sheets

(51) Int. Cl.
*H04N 21/81* (2011.01)
*H04N 21/8358* (2011.01)
*H04N 21/8547* (2011.01)

(56) References Cited

U.S. PATENT DOCUMENTS

| | | | | |
|---|---|---|---|---|
| 6,314,577 | B1* | 11/2001 | Pocock | H04H 60/44 379/101.01 |
| 6,400,378 | B1* | 6/2002 | Snook | G11B 27/034 707/999.102 |
| 6,834,308 | B1* | 12/2004 | Ikezoye | G06F 17/3002 348/E7.071 |
| 7,194,752 | B1* | 3/2007 | Kenyon | G10L 25/48 382/118 |
| 7,877,438 | B2* | 1/2011 | Schrempp | H04H 20/14 709/201 |
| 8,458,595 | B1* | 6/2013 | Margulis | G06F 3/0484 715/720 |
| 8,893,167 | B2* | 11/2014 | Sinha | G06T 1/0021 725/14 |
| 2002/0069100 | A1* | 6/2002 | Arberman | G06F 17/30867 705/7.33 |
| 2003/0051252 | A1 | 3/2003 | Miyaoku et al. | |
| 2003/0117428 | A1* | 6/2003 | Li | G06F 17/30787 715/716 |
| 2004/0220926 | A1* | 11/2004 | Lamkin | G06F 17/30017 |
| 2004/0240562 | A1* | 12/2004 | Bargeron | H04N 7/165 375/240.29 |
| 2006/0184538 | A1* | 8/2006 | Randall | G06F 17/30041 |
| 2006/0195860 | A1* | 8/2006 | Eldering | G06F 17/30802 725/19 |
| 2008/0036917 | A1* | 2/2008 | Pascarella | G11B 27/11 348/702 |
| 2008/0126191 | A1* | 5/2008 | Schiavi | G06Q 30/0258 705/14.56 |
| 2009/0199118 | A1* | 8/2009 | Sabato | G06F 11/321 715/765 |
| 2009/0300498 | A1* | 12/2009 | Falchuk | G06F 17/30058 715/719 |
| 2010/0287196 | A1* | 11/2010 | Shields | G06F 17/30781 707/769 |
| 2011/0311095 | A1* | 12/2011 | Archer | G06K 9/00744 382/100 |
| 2012/0095958 | A1* | 4/2012 | Pereira | G06F 17/3002 707/609 |
| 2012/0191716 | A1* | 7/2012 | Omoigui | H01L 27/1463 707/740 |
| 2012/0236201 | A1* | 9/2012 | Larsen | H04N 21/235 348/468 |
| 2012/0254404 | A1* | 10/2012 | Wilkinson | H04L 67/303 709/224 |
| 2012/0317240 | A1* | 12/2012 | Wang | H04H 60/37 709/219 |
| 2013/0070152 | A1* | 3/2013 | Berkowitz | H04N 21/235 348/500 |
| 2013/0103716 | A1 | 4/2013 | Yamagishi | |
| 2013/0145414 | A1 | 6/2013 | Yamagishi | |
| 2013/0205318 | A1* | 8/2013 | Sinha | G06T 1/0021 725/14 |

OTHER PUBLICATIONS

Ng, Tobun D., et al., "Collages as Dynamic Summaries of Mined Video Content for Intelligent Multimedia Knowledge Management", AAAI Spring Symposium Series on Intelligent Multimedia Knowledge Management, Mar. 2003, 10 pages.*

Shamma, David A., et al., "Watch What I Watch", MM '07, Augsburg, Bavaria, Germany, Sep. 23-28, 2007, 9 pages.*

Wang, Zhe, et al., "VFerret: Content-Based Similarity Search Tool for Continuous Archived Video", CARPE '06, Santa Barbara, CA, Oct. 28, 2006, 7 pages.*

Schoeffmann, Klaus, et al., "The Video Explorer—A Tool for Navigation and Searching within a Single Video based on Fast Content Analysis", MMSys '10, Phoenix, AZ, Feb. 22-23, 2010, pp. 247-258.*

Wactlar, Howard D., "The Challenges of Continuous Capture, Contemporaneous Analysis, and Customized Summarization of Video Content", Defining a Motion Imagery Research and Development Program Workshop, Herndon, VA, Nov. 29-30, 2001, 9 pages.*

Swanberg, Deborah, et al., "Knowledge Guided Parsing in Video Databases", Proc. SPIE, vol. 1908, Storage and Retrieval for Image and Video Databases, Apr. 14, 1993, pp. 13-24.*

Little, T. D. C., et al., "A Digital On-Demand Video Service Supporting Content-Based Queries", MM '93, Anaheim, CA, Aug. 2-6, 1993, pp. 427-436.*

Extended European Search Report issued on Jan. 28, 2016 in Patent Application No. 13816121.1, 9 pages.

International Search Report issued Oct. 15, 2013, in PCT/JP2013/068148 with English translation of category of cited documents.

* cited by examiner

| | |
|---|---|
| ACR QUERY IDENTIFIER | ~91 |
| EXTRACTION SCHEME IDENTIFIER | ~92 |
| SERVICE IDENTIFIER | ~93 |
| CONTENT IDENTIFIER | ~94 |
| REPRODUCTION TIME | ~95 |
| LOCAL TIMESTAMP | ~96 |
| TIMELINE DATA | ~97 |
| ORIGINATOR ADDRESS | ~98 |
| SIGNATURE | ~99 |

90

| | |
|---|---|
| ACR QUERY IDENTIFIER | ~91 |
| SERVICE IDENTIFIER | ~93 |
| RECOGNITION FAIL FLAG | ~101 |
| ORIGINATOR ADDRESS | ~98 |
| SIGNATURE | ~99 |

90

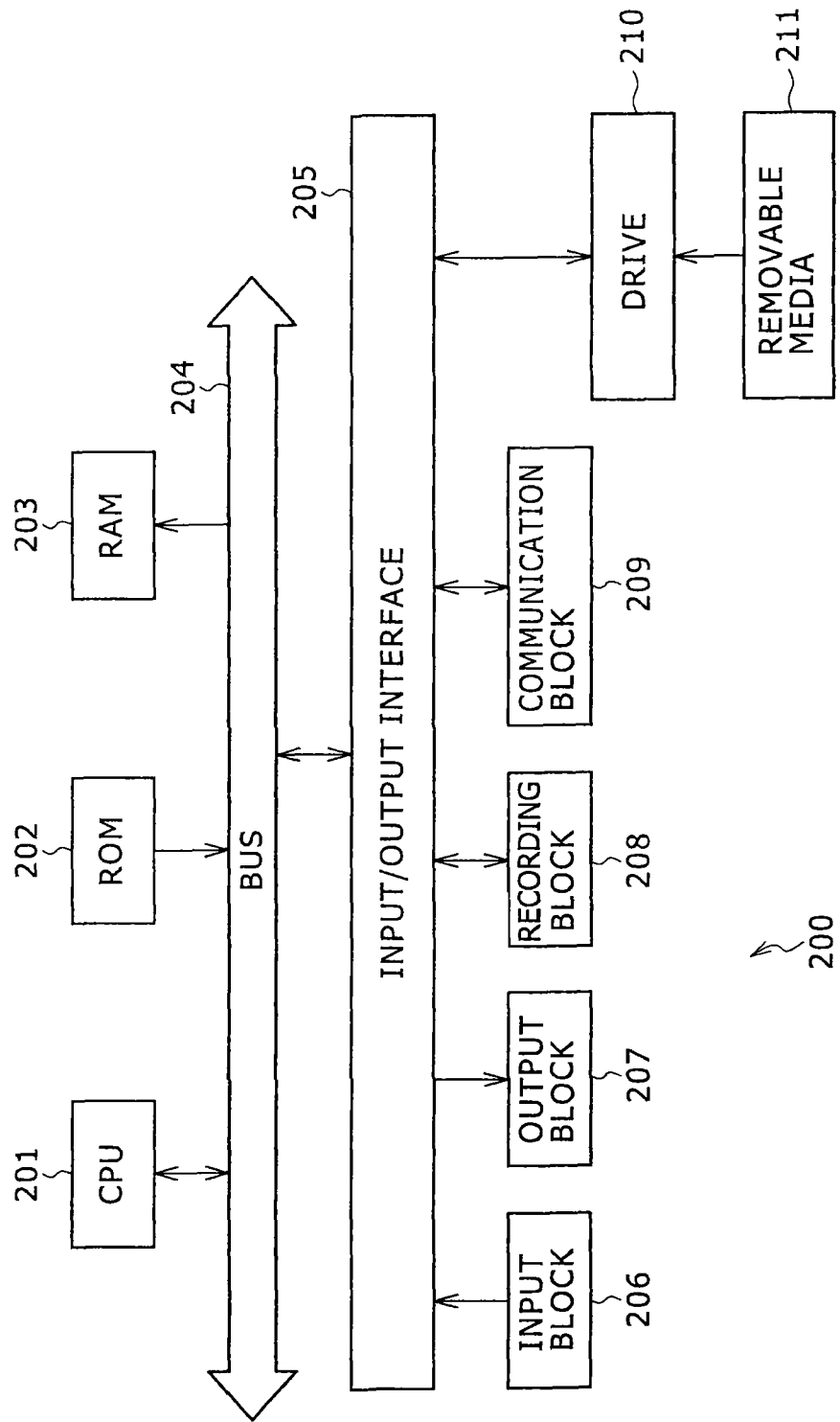

TRANSMISSION APPARATUS, INFORMATION PROCESSING METHOD, PROGRAM, RECEPTION APPARATUS, AND APPLICATION-COORDINATED SYSTEM

CROSS-REFERENCE TO RELATED APPLICATION

This application claims the benefit of priority of Provisional Application Ser. No. 61/670,900, filed Jul. 12, 2012, the entire contents of which is incorporated herein by reference.

BACKGROUND

The present disclosure relates to a transmission apparatus, an information processing method, a program, a reception apparatus, and an application-coordinated system and, more particularly, to a transmission apparatus, an information processing method, a program, a reception apparatus, and an application-coordinated system that are configured for the suitable use in the execution of an application program in coordination with the progression of content such as a television program.

For example, suppose the displaying on the screen the information (casts, outlines, previews, and so on) associated with a TV (television) program (hereafter referred to simply as a program) being viewed and the information (news, weather forecast, traffic information, and so on) not directly associated with the program being viewed but helpful for viewers.

In order to realize this, a command for capturing and activating a dedicated application program (hereafter referred to simply as an application) may be transmitted to a TV receiver or the like in coordination with the progression of a program. Actually, in Japan and Europe, this method has been realized by transmitting such a command and such an application by use of the band for data broadcasting in a TV broadcast signal (refer to Japanese Patent Laid-Open No. 2006-50237, for example).

On the other hand, in the U.S., the band for data broadcasting is not arranged in the TV broadcast signal and no method for covering this situation has been established, so that the execution of an application in coordination with the progression of a program has not been realized.

It should be noted that, in the U.S., more households watch programs through CATV (Community Antenna Television) and IPTV (Internet Protocol Television) than the households watching programs by directly receiving TV broadcast signals by TV receivers. With CATV and IPTV, only video and audio signals of a program may be extracted from TV broadcast signals to distribute the extracted video and audio signals, so that, if the band for data broadcasting is arranged in TV broadcast signals in the U.S., there is no assurance that the data broadcast signals including the data associated with an application is transmitted to reception apparatuses.

Further, recently, there are demands for the execution of an application in coordination not only with a program being broadcast but also with a recorded program, a video reproduced from a package media such as DVD (Digital Versatile Disc) or BD (Blu-ray disc), or given content such as a moving picture downloaded from the Internet.

SUMMARY

As described above, the execution of an application in coordination with the progression of given content being viewed requires the recognition of that content. For a method of the recognition, the application of a technique called ACR (Automatic Content Recognition) is supposed.

ACR recognizes the content being viewed by comparing the signature data (of feature quantity) extracted from the content being viewed by a predetermined extraction scheme with the content signature data registered in a database in advance.

It should be noted that the database of an ACR server for the recognition of content by use of ACR also contains the information indicative of content and the information indicative of applications to be executed in coordination with the progression of content, in addition to the above-mentioned content signature data. These methods are provided from a content provider such as a broadcasting station or an application provider, for example.

The management and operation of an ACR server are executed by not only a broadcasting station, but also a variety of business operators. As a result, the provision of two or more ACR servers is supposed. In such a case too, it is desired for content providers and application providers to be capable of supplying the information about content and applications to each ACR server through a common interface.

In view of the foregoing situation, the present disclosure makes it possible to commonize an interface between two or more ACR servers for use in the recognition of content in the execution of an application in coordination with the progression of given content being viewed.

In carrying out the disclosure and according to a first mode thereof, there is provided a transmission apparatus. This transmission apparatus has at least one content recognition section having a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application; a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus; and a timeline data generation section configured to generate the timeline data and collectively supply the generated timeline data to the at least one content recognition section, the generated timeline data being common to the at least one content recognition section.

The above-mentioned transmission apparatus according to the first mode may further have a user interface block configured to control the timeline data generation section.

The above-mentioned transmission apparatus according to the first mode may still further have a signature data extraction block configured to extract the signature data from the content to be viewed on the reception apparatus by an extraction method corresponding to the at least one recognition server.

The above-mentioned content recognition section may yet further has a reference data generation block configured to generate the reference data by use of the signature data extracted by the signature data extraction block.

The above-mentioned signature data extraction block may generate a finger print as the signature data.

In carrying out the disclosure and according to the first mode thereof, there is provided an information processing method used in a transmission apparatus. The transmission apparatus includes at least one content recognition section having a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application, and a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus. The information processing method includes: generating the timeline data to be collectively supplied to the at least one content recognition section, the generated timeline data being common to the at least one content recognition section; and collectively supplying the common timeline data to the at least one content recognition section.

In carrying out the disclosure and according to the first mode thereof, there is provided a program configured to cause a computer to function as: at least one content recognition section having a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application; a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus; and a timeline data generation section configured to generate the timeline data and collectively supply the generated timeline data to the at least one content recognition section, the generated timeline data being common to the at least one content recognition section.

In the first mode of the present disclosure, timeline data to be collectively supplied to at least one content recognition section is generated and the generated timeline data is collectively supplied thereto. This at least one content recognition section has a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application; a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus; and a timeline data generation section configured to generate the timeline data and collectively supply the generated timeline data to the at least one content recognition section, the generated timeline data being common to the at least one content recognition section.

In carrying out the disclosure and according to a second mode thereof, there is provided a reception apparatus. This reception apparatus has an extraction block configured to extract signature data indicative of a feature of reproduced content from the reproduced content; a query generation block configured to generate a query at least including the extracted signature data, transmit the generated query to at least one content recognition section of a transmission apparatus, and receive a response returned from the at least one content recognition section in response to the query; and an application execution block configured to capture an application corresponding to reproduced content on the basis of timeline data supplied collectively and commonly to the at least one content recognition section, the timeline data being included in the received response, and execute the captured application in coordination with the progression of the reproduced content.

The above-mentioned application execution block may capture the application corresponding to the reproduced content on the basis of an application identifier written to the timeline data included in the received response.

The above-mentioned application execution block may capture an application identifier of the application corresponding to the reproduced content on the basis of an event identifier written to the timeline data included in the received response and capture the application corresponding to the reproduced content on the basis of the captured application identifier.

In the second mode of the present disclosure, signature data indicative of features of reproduced content is extracted from this content and a query at least including the extracted signature data is generated to be transmitted to at least one content recognition section of a transmission apparatus. In response to this query, a response returned from at least one content recognition section is received. In addition, on the basis of timeline data to be collectively and commonly supplied to at least one content recognition section, this timeline data being included in the received response, an application corresponding to the above-mentioned content is captured to be executed in coordination with the progression of this content.

In carrying out the disclosure and according to a third mode thereof, there is provided an application-coordinated system. This application-coordinated system has a transmission apparatus configured to transmit content and a reception apparatus configured to receive the content. This transmission apparatus has at least one content recognition section having a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application; a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus; and a timeline data generation section configured to generate the timeline data and collectively supply the generated timeline data to the at least one content recognition section, the generated timeline data being common to the at least one content recognition section. The above-mentioned reception apparatus has an extraction block configured to extract signature data indicative of a feature of reproduced content from the reproduced content; a query generation block configured to generate a query at least including the extracted signature data, transmit the generated query to at least one content recognition section of a transmission apparatus, and receive a response returned from the at least one content recognition section; and an application execution block configured to capture an application corresponding to reproduced content on the basis of timeline data supplied collectively and commonly to the at least one content recognition section, the timeline data being included in the received response, and execute the captured application in coordination with the reproduced content.

In the application-coordinated system according to the third mode of the present disclosure, timeline data to be commonly and collectively supplied to at least one content recognition section is generated and the generated common timeline data is collectively supplied to at one content recognition section by the transmission apparatus. This transmission apparatus has at least one content recognition section having a database block configured to store reference data including at least signature data indicative of features of content that is viewed on a reception apparatus, the signature data being generated from the content, and a content identifier indicative of the content from which the signature data is generated and timeline data including at least an application identifier indicative of an application to be executed in coordination with the content and timeline information indicative of an execution timing of the application; a response generation block configured to recognize content from which signature data included in a query transmitted from the reception apparatus is extracted by referencing the database block, generate a response including the timeline data including a content identifier indicative of the recognized content and the application identifier indicative of an application to be executed in coordination with the progression of the recognized content, and return the generated response to the reception apparatus; and a timeline data generation section configured to generate the timeline data and collectively supply the generated timeline data to the at least one content recognition section, the generated timeline data being common to the at least one content recognition section. In addition, signature data indicative of features of the above-mentioned content is extracted therefrom and a query at least including the extracted signature data is generated to be transmitted to at least one content recognition section of the transmission apparatus. A response returned from the content recognition section in response to the query is received. Further, on the basis of timeline data commonly and collectively supplied to at least one content recognition section, an application corresponding to the above-mentioned content is captured to be executed in coordination with the progression of the content.

According to the first mode of the present disclosure, the interface for two or more content recognition sections for use in content recognition may be commonized.

According to the second mode of the present disclosure, an application may be executed in coordination with the progression of given content being viewed.

According to the third mode of the present disclosure, in the execution of an application in coordination with the progression of given content being viewed, the interface to two or more ACR servers for use in content identification may be commonized.

BRIEF DESCRIPTION OF THE DRAWINGS

FIG. 16 is a block diagram illustrating an exemplary configuration of a computer.

DETAILED DESCRIPTION OF THE PREFERRED EMBODIMENTS

Now, best modes (or embodiments) of the present disclosure will be described below in detail with reference to the accompanying drawings.

[Exemplary Configuration of an Application-Coordinated System]

Figure 1:
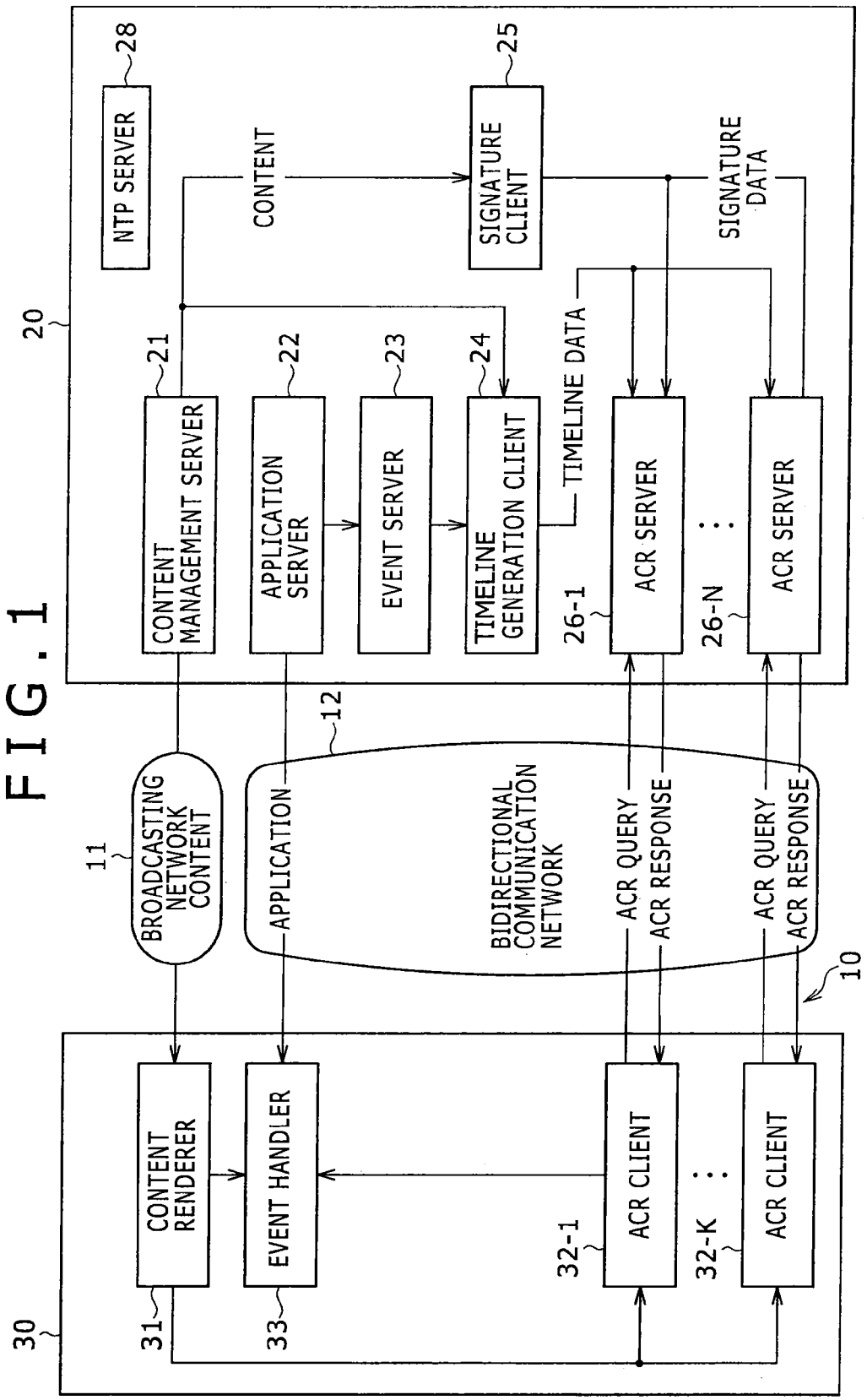
FIG. 1 is a block diagram illustrating an exemplary configuration of an application-coordinated system practiced as one embodiment of the present disclosure.

Referring to FIG. 1, there is shown an exemplary configuration of an application-coordinated system practiced as one embodiment of the present disclosure.

This application-coordinated system 10 recognizes (or identifies) the content being viewed by a user on a monitor that is the screen of a TV receiver and executes an application in coordination with the progression of the recognized content.

It should be noted that content herein is not limited to a program being broadcast by a TV receiver. For example, content includes all kinds of AV (Audio Visual) content, such as a program recorded and reproduced by a video recorder, a video like a movie reproduced from a package media by a multimedia player, and a moving image downloaded through the Internet. In addition, a commercial message (hereafter referred to as a CM) that is inserted between programs or halfway in a program is also included in the content.

The application-coordinated system 10 has a transmission apparatus 20 and two or more reception apparatuses 30 connected to the transmission apparatus 20 through a broadcasting network 11 and a bidirectional communication network 12. The broadcasting network 11 is indicative of a TV broadcasting network, a CATV network, or an IPTV network. The bidirectional communication network 12 is indicative of an IP communication network, such as the Internet.

The reception apparatus 30 is assumed to have arranged at a user home for example in a condition in which the reception apparatus 30 is built in a TV receiver for example.
[Description of the transmission apparatus 20]

The transmission apparatus 20 has a content management server 21, an application server 22, an event server 23, a timeline generation client 24, a signature client 25, two or more ACR servers 26-1 through 26-N, and an NTP server 28.

The content management server 21 broadcasts content, such as a program and a CM, through the broadcasting network 11.

In addition, the content management server 21 supplies the content that may be viewed at the reception side to the timeline generation client 24 and the signature client 25 in a decoded state. This content may be archived content or a live stream content currently being broadcast.

The application server 22 generates and manages applications that are executed in coordination with the progression of content, notifies the event server 23 of an application identifier (AppsUrl) for identifying an application in response to a search from the event server 23, and supplies the metadata to be used by this application to the event server 23. In addition, in response to a request from an event handler 33 of the reception apparatus 30, the application server 22 supplies an application and the metadata to be used by this application via the bidirectional communication network 12.

The event server 23 generates an event message associated with the processing for executing an application in coordination with the progression of content (this processing hereafter referred to as an event) and notifies the timeline generation client 24 of this event message. Details of the event message will be described later with reference to FIG. 3.

The timeline generation client 24 generates timeline data with an event message related with the timing of content progression and supplies the common timeline data to all of the ACR servers 26-1 through 26-N at once. Details of timeline data will be described later with reference to FIG. 5.

The signature client 25 extracts (or generates) signature data from the content supplied from the content management server 21 by use of an extraction scheme corresponding to each ACR server 26 with a predetermined sampling period and supplies the extracted signature data to the ACR servers 26-1 through 26-N along with the content identifier of the content from which the signature data has been extracted. It should be noted that a finger print may be generated as the signature data.

The same finger print may be obtained before and after the conversion of content resolution, mode ratio, bit rate, coding format, or the like. Therefore, use of a finger print as signature data allows the accuracy of content recognition.

In response to an ACR query transmitted from corresponding ACR client 32-$i$ of the ACR client 32-1 through 32-N of the reception apparatus 30, an ACR server 26-$i$ ($i=1, \ldots N$) recognizes (or identifies) the content being viewed on the reception apparatus 30. Further, the ACR server 26-$i$ generates an ACR response including information about an application to be executed in coordination with the progression of this content and returns the generated ACR response to the ACR client 32-$i$. An ACR query and an ACR response will be described later.

The NTP server 28 supplies common time information to the content management server 21, the application server 22, the event server 23, the timeline generation client 24, the signature client 25, and the ACR servers 26-1 through 26-N that make up the transmission apparatus 20.

It should be noted that the content management server 21, the application server 22, the event server 23, the timeline generation client 24, the signature client 25, and the ACR servers 26-1 through 26-N that make up the transmission apparatus 20 may be arranged at one location in concentration or in a dispersed manner. In addition, these components may be combined with one another as appropriate.
[Description of the Reception Apparatus 30]

The reception apparatus 20 has a content renderer 31, two or more ACR clients 32-1 through 32-K, and the event handler 33.

The content renderer 31 captures and branches all pieces of content displayed on the screen such as a TV receiver in which the reception apparatus 30 is incorporated and supplies the resultant content to the ACR client 32. In other words, the content renderer 31 captures and branches not only the content broadcast and received from the content management server 21, but also the content entered via various input terminals (an HDMI terminal and so on for example) of the TV receiver and supplies the resultant content to the ACR clients 32-1 through 32-N.

The ACR clients 32-$i$ ($i=1, \ldots K$ ($K \leq N$)) corresponds to the ACR servers 26-$i$ of the transmission apparatus 20 and extracts signature data from the content entered from the content renderer 31 with a predetermined sampling period by the extraction scheme corresponding to the ACR server 26-$i$.

In addition, the ACR client 32-$i$ generates an ACR query storing the extracted signature data and user profile data and transmits the generated query to the corresponding ACR server 26-$i$ of the ACR servers 26-1 through 26-N of the transmission apparatus 20 via the bidirectional communication network 12.

The user profile data stored in the ACR query may contain user's demographic attributes (age, gender, occupation, educational background, living area, mail address, hobby, preference, using language, family size, content viewing trend, and so on), the specifications of the reception apparatus 30 (the type of available CODEC for example), the congestion state of the bidirectional communication network 12, natural environment information (weather, temperature, humidity, and so on), and other items.

Further, the ACR client 32-i receives and holds an ACR response returned from the ACR server 26-i in response to the transmitted ACR query. In addition, the ACR client 32-i analyzes the held ACR response and notifies the event handler 33 of an analysis result. It should be noted that the timeline data included in the ACR response is commonly supplied from the timeline generation client 24 to all ACR servers 26, so that the processing of analyzing ACR responses and timeline data in each ACR client 32 may be made common.

On the basis of an ACR response analysis result, the event handler 33 captures an application corresponding to the content being viewed from the application server 22 via the bidirectional communication network 12 and executes the obtained application. In addition, the event handler 33 captures metadata to be processed by an active application from the ACR client 32 or the application server 22.

[Detail Exemplary Configuration of the ACR Server 26]

Figure 2:
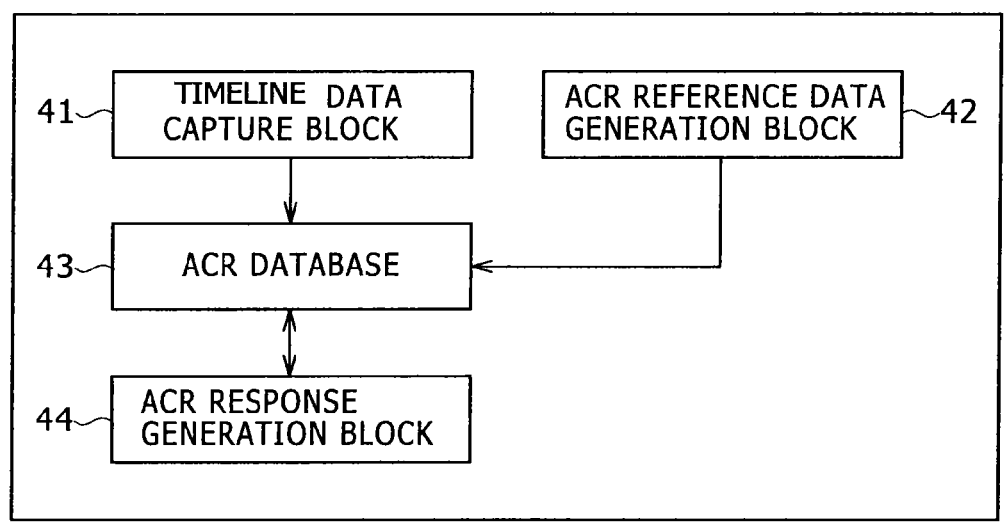
FIG. 2 is a block diagram illustrating an exemplary configuration of an ACR server.

Referring to FIG. 2, there is shown detail exemplary configuration of the ACR server 26.

The ACR server 26 has a timeline data capture block 41, an ACR reference data generation block 42, an ACR database 43, and an ACR response generation block 44.

The timeline data capture block 41 registers into the ACR database 43 the timeline data indicative of the correlation between content progression timing and event supplied from the timeline generation client 24.

The ACR reference data generation block 42 generates ACR reference data by relating the signature data supplied from the signature client 25 with a content identifier indicative of the content from which this signature data is extracted and a preproduction time indicative of extraction (or generation) timing and registers the generated ACR reference data into the ACR database 43. A data structure of ACR reference data will be described later with reference to FIG. 6.

The ACR database 43 generates an index of the timeline data from the timeline data capture block 41 and the ACR reference data from the ACR reference data generation block 42 and stores the generated index. It should be noted that the ACR database 43 may be developed in the cloud.

The ACR response generation block 44 recognizes the content from which the signature data included in an ACR query transmitted from the ACR client 32 is extracted by referencing the ACR database 43 and identifies the timeline data related with this content. Further, the ACR response generation block 44 generates an ACR response including a content identifier obtained by the recognition and the timeline data corresponding to this content identifier. It should be noted that, in generating an ACR response, data suitable for the user of the reception apparatus 30 may be transmitted by matching and filtering the metadata and so on in the timeline data included in the ACR response on the basis of user profile data included in an ACR query.

[Structures of Various Types of Data]

The following describes the structures of various types of data described above.

[Data Structure of an Event Message]

Figure 3:
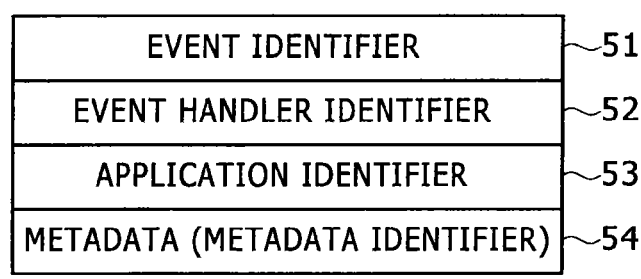
FIG. 3 is a diagram illustrating a data structure of an event message.

Referring to FIG. 3, there is shown a data structure of an event message that is generated by the event server 23 of the transmission apparatus 20.

An event message 50 is generated for each event and stores an event identifier 51, an event handler identifier 52, an application identifier 53, and metadata 54.

The event identifier 51 is identification information of each event. The event handler identifier 52 is information indicative of the event handler 33 of the reception apparatus 30 that processes the event concerned. The application identifier 53 is information for identifying an application that is executed to realize the event concerned. The application identifier 53 is indicated by URL (Uniform Resource Locator) for example and representative of the capture source (the application server 22) of the application concerned. The metadata 54 is data that is processed by an application indicated by the application identifier 53. It should be noted that, instead of the metadata 54, a metadata identifier indicated by a URL indicative of the capture source may be stored.

[Data Structure of Timeline Data]

Figure 4:
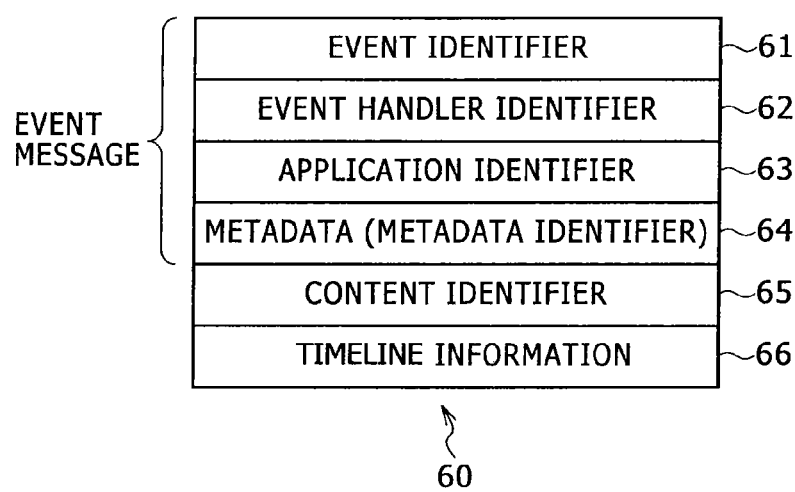
FIG. 4 is a diagram illustrating a data structure of timeline data.

Referring to FIG. 4, there is shown a data structure of timeline data generated by the timeline generation client 24 of the transmission apparatus 20.

Timeline data 60 is obtained by adding content identifier 65 and timeline information 66 to an event identifier 61 quoted from the event message 50, an event handler identifier 62, an application identifier 63, and metadata 64. The content identifier 65 is information indicative of the content with which an event is related. The timeline information 66 is information indicative of the progression timing of the content related with an event.

Figure 5:
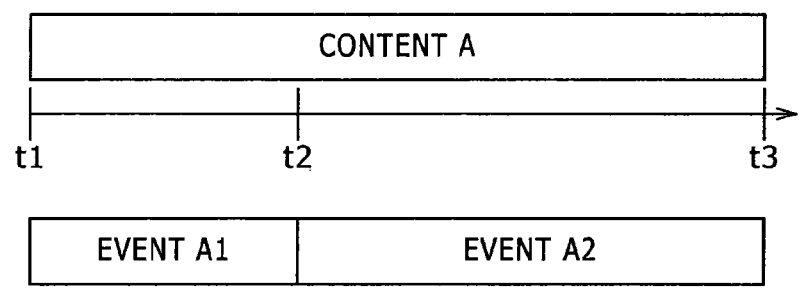
FIG. 5 is a diagram illustrating an example of correlation between content progression timing and event.

For example, as shown in FIG. 5, a specific description example in which event A1 is executed from progression timing t1 of content A to progression timing t2 and event A2 is executed from progression timing t2 to progression timing t3 is as follows.

```
<timeLine>//timeline data
    <mediaId>MeiaID1</mediaId>//content identifier
    <event>//description corresponding to event A1
    <eventHandler>EventHandlerID1Url</eventHandler>//event
handler identifier
    <appsUrl>Apps1Url</appsUrl>//application identifier
    <startTime>t1</startTime>//timeline information
    <endTime>t2<endTime>//timeline information
    </event>
    <event>//description corresponding to event A2
    <eventHandler>EventHandlerID1Url</eventHandler>//event
handler information
    <appsUrl>Apps1Url</appsUrl>//application identifier
    <metadataUrl>Metadata1Url</metadataUrl>//metadata
identifier
    <startTime>T2</startTime>//timeline information
    <endTime>T3</endTime>//timeline information
    </event>
    . . .
</timeLine>
```

[Data Structure of ACR Reference Data]

Figure 6:
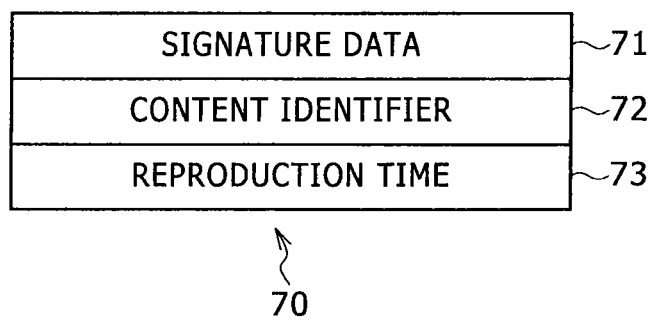
FIG. 6 is a diagram illustrating a data structure of ACR reference data.

Referring to FIG. 6, there is shown a data structure of ACR reference data that is generated by the ACR reference data generation block 42 of the ACR server 26.

In ACR reference data 70, signature data 71 supplied from the signature client 25 is related with content identifier 72 and a reproduction time 73.

The signature data 71 is supplied from the signature client 25. The content identifier 72 is information for identifying the content from which the signature data 71 concerned is extracted. The reproduction time 73 is indicative of the progression timing of the content when the signature data 71 concerned is extracted from the content indicated by the content identifier 72 and is expressed by an elapsed from the beginning of the content concerned.

[Data Structure of ACR Query]

Figure 7:
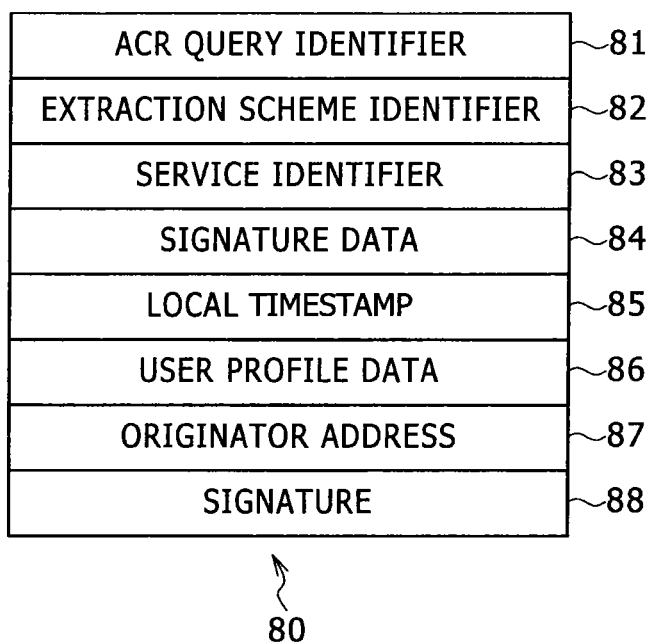
FIG. 7 is a diagram illustrating a data structure of an ACR query.

Referring to FIG. 7, there is shown a data structure of an ACR query that is transmitted from the ACR client 32 to the ACR server 26.

An ACR query 80 includes an ACR query identifier 81, an extraction scheme identifier 82, a service identifier 83, signature data 84, a local timestamp 85, a user profile data 86, an originator address 87, and a signature 88.

The ACR query identifier 81 is information for uniquely identifying the ACR query 80 concerned. The extraction scheme identifier 82 is information for identifying an extraction scheme used in the extraction of the signature data 84. The service identifier 83 is information for selecting the ACR server 26 for capturing an ACR response by transmitting the ACR query 80 concerned, from two or more ACR servers 26-1 through 26-N.

The signature data 84 is extracted from content by the ACR client 32. The local timestamp 85 is indicative of a timing with which the signature data 84 is extracted from content and expressed by a time indicated by a local system clock of the reception apparatus 30.

The user profile data 86 is information including user demographic attributes and so on. The originator address 87 is an address in the bidirectional communication network 12 of the ACR client 32 that originates the ACR query 80 concerned and used for information indicative of a return address of an ACR response generated by the ACR server 26 in response to the ACR query 80 concerned. The signature 88 is used to prevent the ACR query 80 concerned from being falsified. It should be noted that the ACR query 80 may be encrypted in its entirety before transmission.

[Data Structure of ACR Response]

Figure 8A:
FIGS. 8A and 8B are diagrams illustrating data structures of ACR response.
Figure 8B:

Referring to FIGS. 8A and 8B, there is shown data structures of an ACR response that is returned from the ACR server 26 to the ACR client 32.

It should be noted that FIG. 8A shows a data structure of an ACR response at the time the content from which the signature data 84 included in an ACR query 80 has been recognized, namely, at the time the content being viewed on the reception apparatus 30 has been recognized. FIG. 8B shows a data structure of an ACR response to be obtained when content could not be recognized.

An ACR response 90 (FIG. 8A) obtained when the content being viewed on the reception apparatus 30 could be recognized includes an ACR query identifier 91, an extraction scheme identifier 92, a service identifier 93, a content identifier 94, a reproduction time 95, a local timestamp 96, a timeline data 97, an originator address 98, and a signature 99.

On the other hand, an ACR response 90 (FIG. 8B) that could not recognize the content being viewed on the reception apparatus 30 includes the ACR query identifier 91, the service identifier 93, the originator address 98, and signature 99, and a recognition fail flag 101.

The ACR query identifier 91, the extraction scheme identifier 92, the service identifier 93, and the local timestamp 96 are used to recognize an ACR query 80 that provided a trigger for the generation of the ACR response 90 concerned and are described by quotation of the ACR query identifier 81, the extraction scheme identifier 82, the service identifier 83, and the local timestamp 85 of the corresponding ACR query 80.

The content identifier 94 and the reproduction time 95 are indicative of a recognition result and are described by quotation of the content identifier 72 and the reproduction time 73 of the corresponding ACR reference data 70.

The timeline data 97 is related with the recognized content and includes the items as shown in FIG. 4.

The originator address 98 is an address on the bidirectional communication network 12 of the ACR server 26 that transmits the ACR response 90 concerned. The signature 99 is used to prevent the ACR response 90 concerned from being falsified. It should be noted that the falsification of the ACR response 90 may be prevented by encrypting the ACR response 90 in its entirety before transmission.

The recognition fail flag 101 is a flag indicative that the content from which the signature data 84 included in the ACR query 80 concerned, namely, the content being viewed on the reception apparatus 30 could not be recognized in the ACR server 26.

[Description of an Operator Screen]

Figure 9:
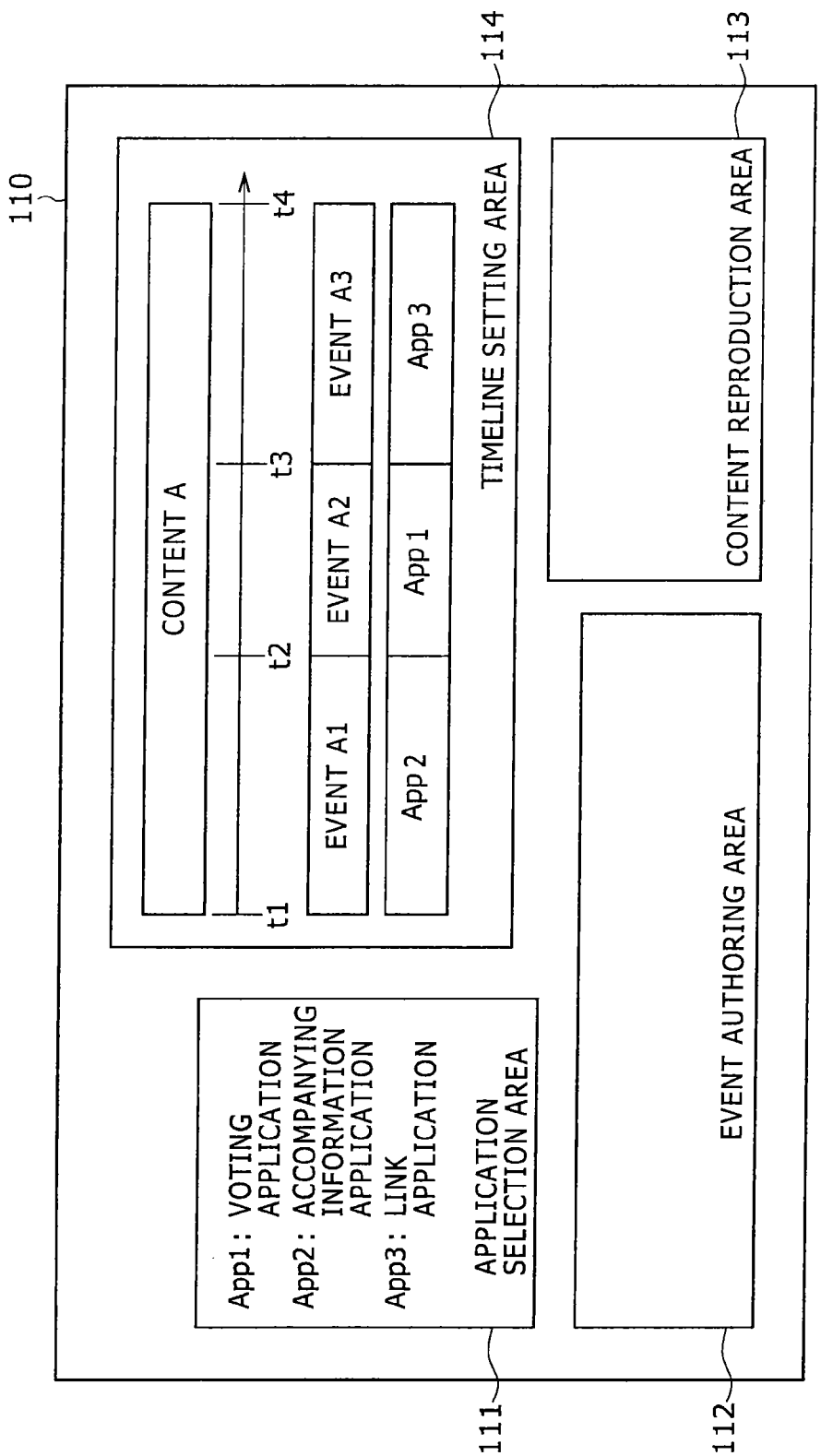
FIG. 9 is a diagram illustrating a display example of an operator screen of a broadcasting apparatus.

Referring to FIG. 9, there is shown a display example of an operator screen 110 for an operator of the transmission apparatus 20 to control the event server 23 and the timeline generation client 24. It is assumed here that that, in the stage where the operator screen 110 concerned is displayed, the content to be related with an event have already been selected.

The operator screen 110 concerned has an application selection area 111, an event authoring area 112, a content reproduction area 113, and a timeline setting area 114.

The application selection area 111 allows the selection of an application to be executed in each event. The event authoring area 112 allows the authoring of information to be displayed by the application executed in each event. The content reproduction area 113 allows the confirmation of the display of content and an application coordinated therewith. The timeline setting area 114 allows the correlation of an event with a content progression timing. In addition, the timeline setting area 114 allows the confirmation of an application related with an event.

[Operations Executed by the Application-Coordinated System 10]

The following describes operations to be executed by the application-coordinated system 10.

Figure 10:
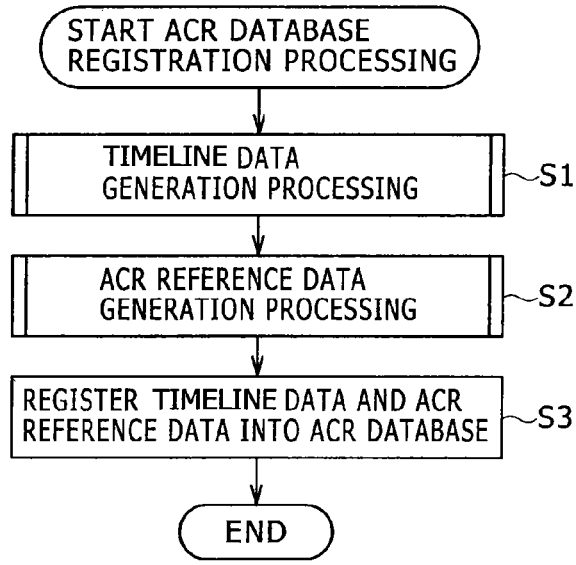
FIG. 10 is a flowchart indicative of ACR database registration processing.

Referring to FIG. 10, there is shown a flowchart indicative of processing (hereafter referred to as ACR database registration processing) that is executed until the ACR database 43 of the ACR server 26 is generated.

Figure 11:
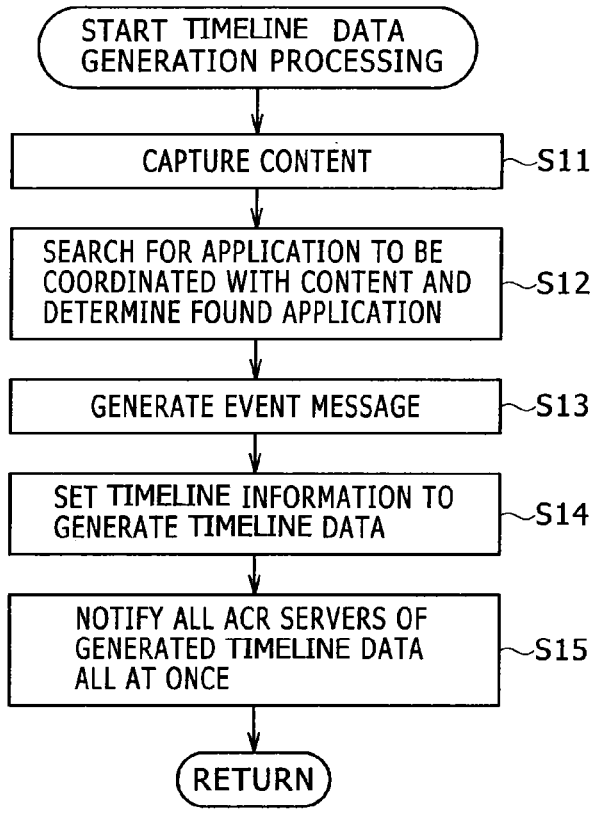
FIG. 11 is a flowchart indicative of timeline data generation processing.

In step S1, timeline data generation processing for generating timeline data is executed. FIG. 11 shows a flowchart indicative of details of the timeline data generation processing.

In step S11, the timeline generation client 24 captures content from the content management server 21. In step S12, the event server 23 searches the application server 22 for an application to be coordinated with the captured content to determine the application and captures the application identifier and so on from the application server 22. In step S13, the event server 23 generates an event message including the application identifier and so on and outputs the generated event message to the timeline generation client 24.

In step S14, the timeline generation client 24 generates timeline data with the event message related with the progression timing of the content. In step S15, the timeline generation client 24 notifies the ACR servers 26-1 through 26-N of the generated timeline data all at once. Thus, the interface (or the timeline data) is commonized for all the ACR servers 26, so that, if the number of ACR servers 26 increases, the resultant increase in the load can be prevented. Here, the timeline data generation processing described so far is terminated and the procedure is returned to step S2 shown in FIG. 10.

Figure 12:
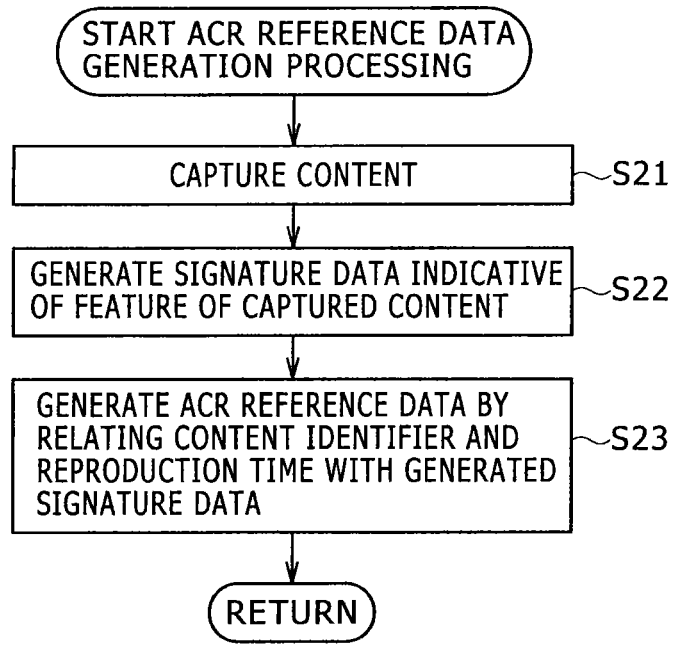
FIG. 12 is a flowchart indicative of ACR reference data generation processing.

In step S2, ACR reference data generation processing for generating ACR reference data is executed in step S2. FIG. 12 shows a flowchart indicative of the ACR reference data generation processing in details.

In step S21, the signature client 25 captures the content from the content management server 21. In step S22, the signature client 25 extracts signature data from the captured content with a predetermined sampling period by an extraction scheme corresponding to each ACR server 26 and supplies the extracted signature data to each ACR server 26 along with the content identifier indicative of the content from which the signature data has been extracted.

In step S23, the ACR reference data generation block 42 of the ACR server 26 generates ACR reference data by relating the signature data supplied from the signature client 25 with the content identifier indicative of the content from which the signature data has been extracted (or generated) and a reproduction time indicative of the extraction (or generation) timing. Thus, the ACR reference data generation processing is terminated and the procedure is returned to step S3 shown in FIG. 10.

It should be noted that the above-mentioned timeline data generation processing of step S1 and the above-mentioned ACR reference data generation processing of step S2 may be executed concurrently.

In step S3, the ACR database 43 creates an index of the timeline data generated in step S1 and the ACR reference data generated in step S2 and stores the created index. Thus, the ACR database registration processing comes to an end.

Figure 13:
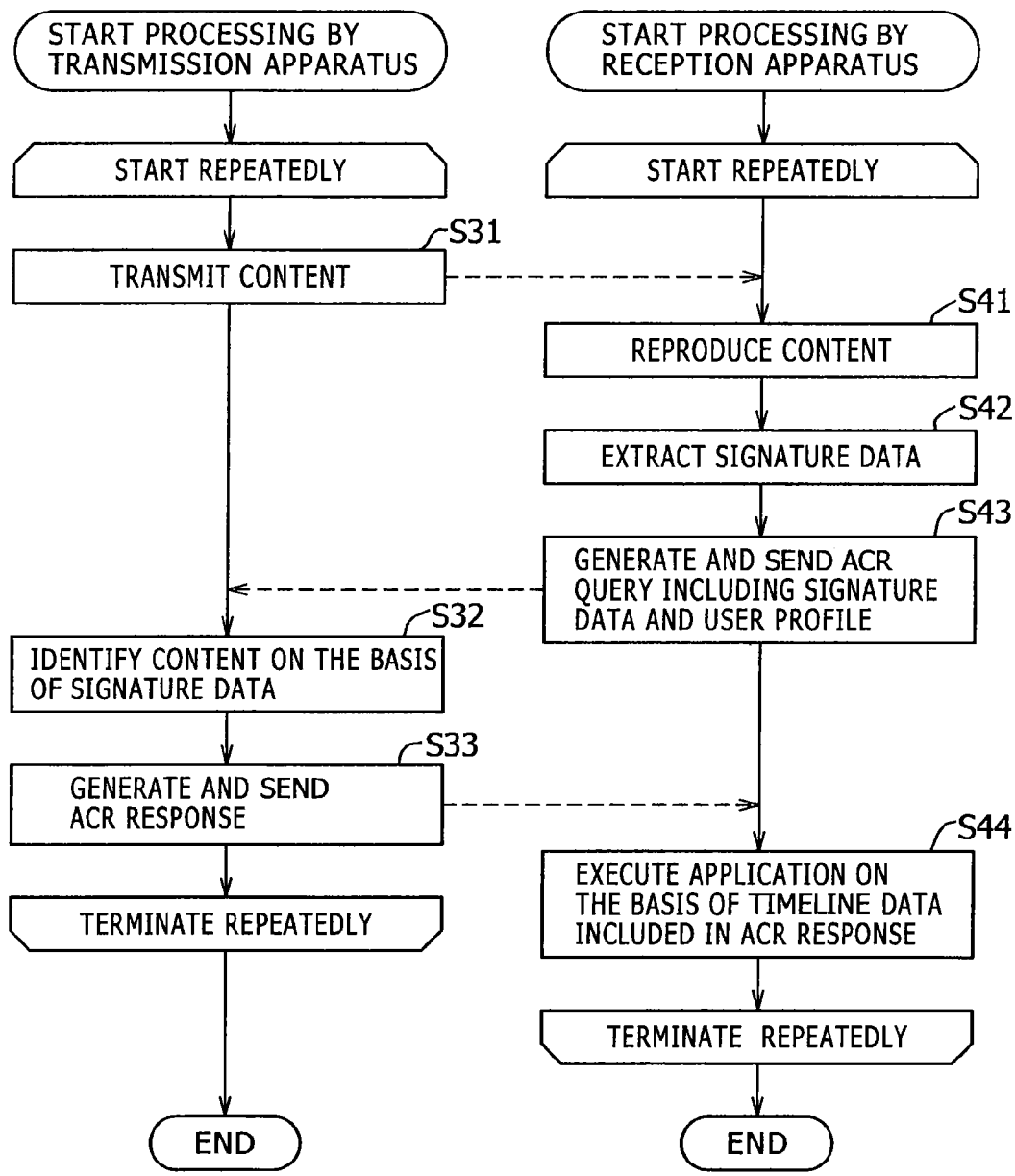
FIG. 13 is a flowchart indicative of a sequence of operations to be executed by the application-coordinated system.

Referring to FIG. 13, there is shown a flowchart indicative of a sequence of operations executed by the entire application-coordinated system 10.

It is assumed here that the transmission apparatus 20 have already executed the above-mentioned ACR database registration processing, thereby generating the ACR database 43 of each ACR server 26.

In this sequence of operations, the transmission apparatus 20 repeats steps S31 through S33 that are described below. On the other hand, the reception apparatus 30 repeats steps S41 through S44 that are described below.

In step S31, the transmission apparatus 20 starts the transmission of content from the content management server 21 via the broadcasting network 11.

On the other hand, the reception apparatus 30 starts the reproduction of content in step S41. It should be noted that this content may not be one that has been transmitted from the transmission apparatus 20.

In step S42, the content renderer 31 captures the content being reproduced (namely, the content being viewed by the user), branches the captured content, and outputs the resultant content to the ACR client 32-*i*. In step S43, the ACR client 32-*i* extracts, with a predetermined sampling period, signature data from the content being viewed entered from the content renderer 31. In addition, every time signature data is extracted, the ACR client 32-*i* generates an ACR query 80 including the extracted signature data and user profile data and transmits the generated ACR query 80 to the ACR server 26-*i*. It should be noted that one or more ACR clients 32 generate and transmit ACR queries.

In the ACR server 26-*i* that have received the ACR query 80 from the ACR client 32-*i*, the ACR response generation block 44 references the ACR database 43 to recognize the content corresponding to the signature data 84 included in the received ACR query 80.

In step S33, the ACR response generation block 44 generates an ACR response 90 in accordance with a content recognition result. In doing so, the ACR response generation block 44 may execute matching or filtering on the metadata 64 in the timeline data 97 to be included in the ACR response 90 on the basis of the user profile data 86 included in the ACR query 80. In addition, the ACR response generation block 44 returns the generated ACR response 90 to the corresponding ACR client 32-*i*.

Having received the ACR response 90 from the ACR server 26-*i*, the ACR client 32-*i* analyzes timeline data 97 included in the received ACR response 90 in step S44 and notifies the event handler 33 indicated by the event handler identifier 62 of the application identifier 63 written in the timeline data 97. The event handler 33 accesses the application server 22 via the bidirectional communication network 12 and captures an application corresponding to the notified application identifier 63, executing the captured application.

It should be noted that, if the application concerned has already been captured, the capture processing is skipped and this application is executed. If the application concerned is already active, the active application captures the metadata 64 of the timeline data 97 of the ACR response 90 from the ACR client 32-*i* and uses the captured metadata 64. If a metadata identifier is written instead of the metadata 64, then the active application captures metadata from the application server 22 via the bidirectional communication network 12 on the basis of this metadata identification and uses the captured metadata.

The above-mentioned processing of steps S31 through S33 and the above-mentioned processing of steps S41 through S44 are repetitively executed while the content is being viewed on the reception apparatus 30. Consequently, the operation of an application coordinated with the progression timing of the content being viewed is realized.

[Variations]

Figure 14:
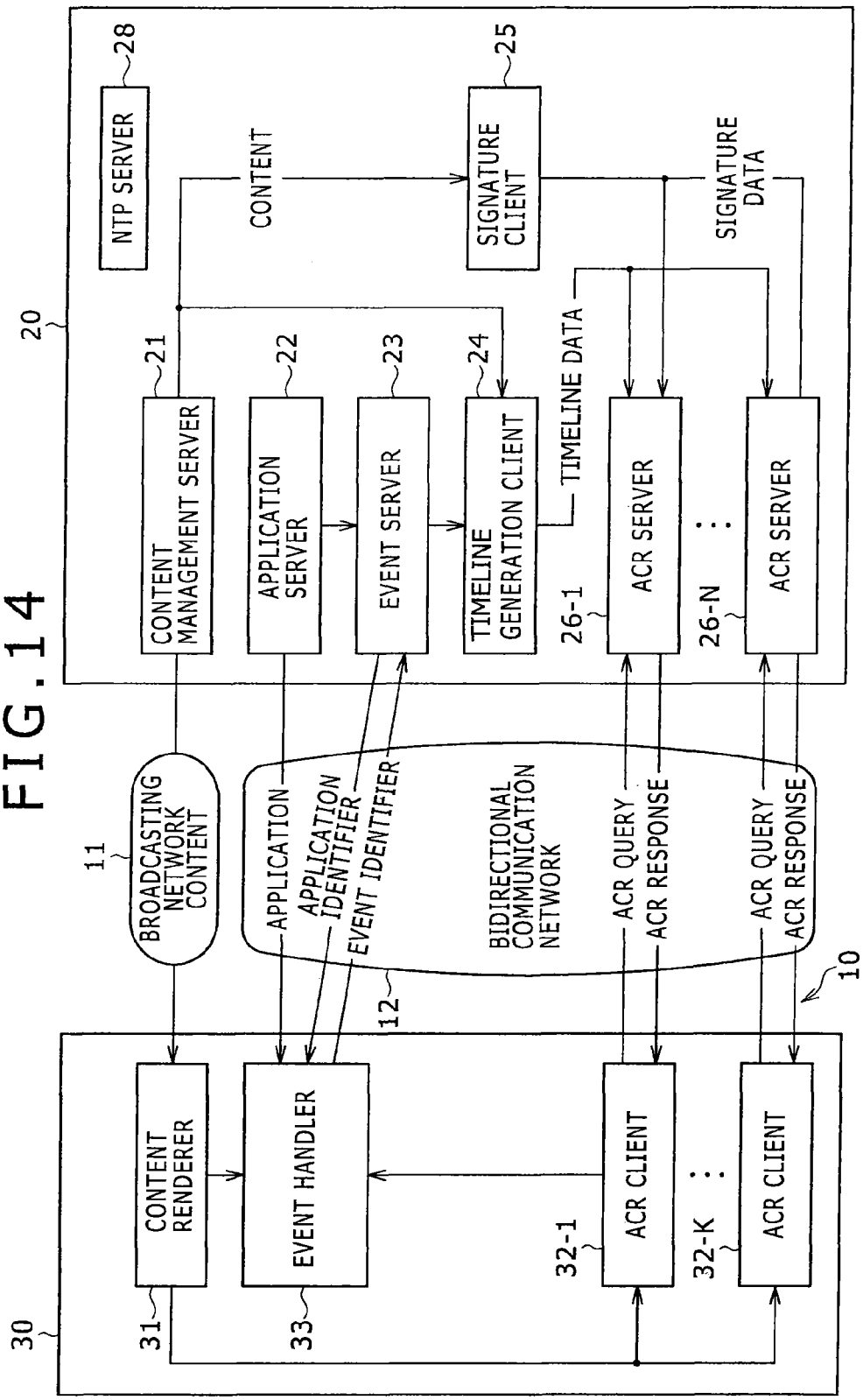
FIG. 14 is a block diagram illustrating a variation of an application-coordinated system.
Figure 15:
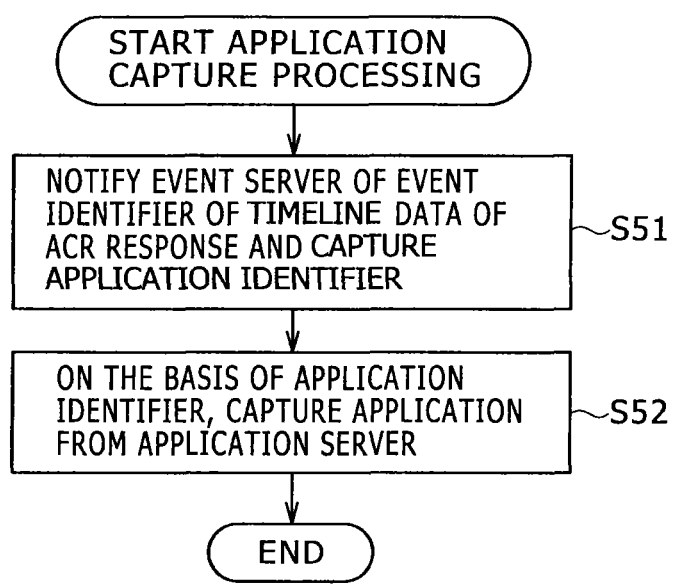
FIG. 15 is a flowchart indicative of application capture processing corresponding to the variation.

The following describes variations to the above-mentioned sequence of operations of the application-coordinated system 10 with reference to FIG. 14 and FIG. 15.

Referring to FIG. 14, there is shown an exemplary configuration of the application-coordinated system 10 corresponding to a variation concerned, in which an arrow indicative of transmitting an event identifier from an event handler 33 to an event server 23 and an arrow indicative of transmitting an application identifier from the event server 23 to the event handler 33 are added, as compared with the configuration shown in FIG. 1.

The difference from the description done above lies in the processing (hereafter referred to as application capture processing) in which in this variation to the above-mentioned sequence of operations, an ACR server 26-*i* of a reception apparatus 30 receives an ACR response 90 and then the event handler 33 captures and executes an application.

Referring to FIG. 15, there is shown a flowchart indicative of the application capture processing in the variation.

Having received an ACR response 90 returned from the ACR server 26-*i* of a transmission apparatus 20, an ACR client 32-*i* of the reception apparatus 30 analyzes timeline data 97 included in the ACR response 90 in step S51 and notifies the event handler 33 indicated by an event handler identifier 62 of an event identifier 61 written in the timeline data 97. The event handler 33 accesses the event server 23 via a bidirectional communication network 12 to transmit the event identifier 61 to the event server 23, thereby capturing a corresponding application identifier 63.

In step S52, the event handler 33 accesses the application server 22 via the bidirectional communication network 12 to capture the application corresponding to the notified application identifier 63 and executes the captured application. Here, the application capture processing in the present variation comes to an end.

It should be noted that the transmission apparatus 20 and the reception apparatus 30 that execute the above-mentioned sequence of operations may be configured by hardware or implemented by software that is executed by a computer. This computer includes a computer that is assembled in a dedicated hardware unit and a general-purpose computer that can implement various functions by installing various programs, for example.

Referring to FIG. 16, there is shown an exemplary hardware configuration of the computer mentioned above.

In a computer 200, a CPU (Central Processing Unit) 201, a ROM (Read Only Memory) 202, and a RAM (Random Access Memory) 203 are interconnected by a bus 204.

The bus 204 is connected with an input/output interface 205. The input/output interface 205 is connected with an input block 206, and output block 207, a recording block 208, a communication block 209, and a drive 210.

The input block 206 is made up of a keyboard, a mouse, and a microphone, for example. The output block 207 is made up of a display monitor and a speaker, for example. The recording block 208 is made up of a hard disk unit or a nonvolatile memory, for example. The communication block 209 is made up of a network interface for example. The drive 210 drives a removable media 211 such as a magnetic disk, an optical disk, an optical magnetic disk, and a semiconductor memory.

The above-mentioned sequence of processing operations are executed when the CPU 201 loads a program from the recording block 208 for example into the RAM 203 through the input/output interface 205 and the bus 204 and executes the loaded program in the computer 200.

Programs to be executed by the computer 200 (or the CPU 201) may be recorded to the removable media 211 that is a package media and provided therein. In addition, the programs may be provided through wired or wireless transmission media such as a local area network, the Internet, and digital satellite broadcasting.

In the computer 200, loading the removable media 211 on the drive 210 installs programs into the recording block 208 through the input/output interface 205. In addition, programs may be received at the communication block 209 through wired or wireless transmission media to be installed in the recording block 208. Alternatively, programs may be installed in the ROM 202 or the recording block 208 in advance.

It should be noted that the programs to be executed by the computer 200 may be executed in a time-dependent manner in the sequences described herein or in parallel or on an on-demand basis.

While preferred embodiments of the present disclosure have been described using specific terms, such description is for illustrative purpose only, and it is to be understood that changes and variations may be made without departing from the spirit or scope of the following claims.

What is claimed is:

1. A transmission apparatus comprising:
content recognition circuitry configured to:
generate and store reference data including at least signature data, a content identifier and timeline data, the signature data including features of content that is reproduced on a reception apparatus and the signature data being generated from the content, the content identifier identifying the content from which the signature data is generated, the timeline data including at least an application identifier and reproduction time information, the application identifier identifying an application to be executed in coordination with the content, and the reproduction time information including an execution timing of the application and a progression time for reproducing the content at a time of generating the signature data, the progression time represented by an elapsed time amount from a beginning of the content;
in response to a query transmitted from the reception apparatus, recognize content from which signature data included in the query is extracted, based on the reference data;
generate a response including a content identifier of the recognized content and the timeline data, the timeline data including the application identifier of an application to be executed in coordination with the progression time of the recognized content; and
return the generated response to the reception apparatus, and timeline data generation circuitry configured to:
generate the timeline data; and
collectively supply the generated timeline data to the content recognition circuitry, the generated timeline data being common to the content recognition circuitry.

2. The transmission apparatus according to claim 1, wherein
the content recognition circuitry is further configured to control the timeline data generation circuitry by a user input via a user interface.

3. The transmission apparatus according to claim 2, wherein
the content recognition circuitry is further configured to extract the signature data from the content to be viewed on the reception apparatus by an extraction method corresponding to the content recognition circuitry.

4. The transmission apparatus according to claim 3, wherein the content recognition circuitry is further configured to generate the reference data by use of the signature data extracted by the content recognition circuitry.

5. The transmission apparatus according to claim 3, wherein the content recognition circuitry generates a finger print as the signature data.

6. An information processing method used in a transmission apparatus, the transmission apparatus including content recognition circuitry and timeline data generation circuitry, the information processing method comprising:
storing, by the content recognition circuitry, reference data including at least signature data, a content identifier and timeline data, the signature data including features of content that is reproduced on a reception apparatus and being generated from the content, the content identifier identifying the content from which the signature data is generated, the timeline data including at least an application identifier and reproduction time information, the application identifier identifying an application to be executed in coordination with the content, and the reproduction time information including an execution timing of the application and a progression time for reproducing the content at a time of generating the signature data, the progression time represented by an elapsed time amount from a beginning of the content,
in response to a query transmitted from the reception apparatus, recognizing, by the content recognition circuitry, content from which signature data included in the query is extracted, based on the reference data, generating, by the content recognition circuitry, a response including a content identifier of the recognized content and the timeline data, the timeline data including the application identifier of an application to be executed in coordination with the progression time of the recognized content, returning, by the content recognition circuitry, the generated response to the reception apparatus, generating, by the timeline data generation circuitry, the timeline data to be collectively supplied to the content recognition circuitry, the generated timeline data being common to the content recognition circuitry, and collectively supplying, by the timeline data generation circuitry, the common timeline data to the content recognition circuitry.

7. A non-transitory computer readable medium comprising computer program instructions that, when executed by a transmission apparatus comprising content recognition circuitry and timeline data generation circuitry cause the content recognition circuitry to:

generate and store reference data including at least signature data, a content identifier and timeline data, the signature data including features of content that is reproduced on a reception apparatus and being generated from the content, the content identifier identifying the content from which the signature data is generated, the timeline data including at least an application identifier and reproduction time information, the application identifier identifying an application to be executed in coordination with the content, and the reproduction time information including an execution timing of the application and a progression time for reproducing the content at a time of generating the signature data, the progression time represented by an elapsed time amount from a beginning of the content, in response to a query transmitted from the reception apparatus, recognize content from which signature data included in the query is extracted, based on the reference data, generate a response including a content identifier of the recognized content and the timeline data, the timeline data including the application identifier indicative of an application to be executed in coordination with the progression time of the recognized content, return the generated response to the reception apparatus, wherein the timeline data generation circuity is caused to:
generate the timeline data; and
collectively supply the generated timeline data to the content recognition circuitry, the generated timeline data being common to the content recognition circuity.

8. A reception apparatus comprising:
circuitry configured to:
extract signature data including a feature of reproduced content from the reproduced content;
generate a query at least including the extracted signature data;
transmit the generated query to content recognition circuitry of a transmission apparatus;
receive a response returned from the content recognition circuitry in response to the query, the response including a content identifier of the reproduced content and timeline data, the timeline data including an application identifier of an application to be executed in coordination with the recognized content and reproduction time information, the reproduction time information including a progression time of the reproduced content represented by an elapsed time amount from a beginning of the content at a time of extracting the signature data, and the timeline data being supplied collectively and commonly to the content recognition circuitry;

capture an application corresponding to the reproduced content on the basis of the timeline data included in the received response; and execute the captured application in coordination with the progression time of the reproduced content.

9. The reception apparatus according to claim 8, wherein the circuitry captures the application corresponding to the reproduced content on the basis of the application identifier included in the timeline data.

10. The reception apparatus according to claim 8, wherein the circuitry captures the application identifier of the application corresponding to the reproduced content on the basis of an event identifier included in the timeline data and captures the application corresponding to the reproduced content on the basis of the captured application identifier.

11. An application-coordinated system comprising:
a transmission apparatus configured to transmit content, and
a reception apparatus configured to receive the content, wherein
the transmission apparatus comprises content recognition circuitry and timeline data generation circuitry,
the content recognition circuitry configured to:
generate and store reference data including at least signature data, a content identifier and timeline data, the signature data including features of content that is reproduced on a reception apparatus and being generated from the content, the content identifier identifying the content from which the signature data is generated, the timeline data including at least an application identifier and reproduction time information, the application identifier identifying an application to be executed in coordination with the content, and the reproduction time information including an execution timing of the application and a progression time for reproducing the content at a time of generating the signature data, the progression time represented by an elapsed time amount from a beginning of the content;

in response to a query transmitted from the reception apparatus, recognize content from which signature data included in the query is extracted, based on the reference data;

generate a response including a content identifier of the recognized content and the timeline data, the timeline data including the application identifier of an application to be executed in coordination with the progression time of the recognized content; and return the generated response to the reception apparatus, and the timeline data generation circuitry configured to:
generate the timeline data; and
collectively supply the generated timeline data to the content recognition circuitry, the generated timeline data being common to the content recognition circuitry, and the reception apparatus comprises circuitry configured to:
extract signature data including a feature of the reproduced content from the reproduced content;

generate a query at least including the extracted signature data;
transmit the generated query content recognition circuitry of a transmission apparatus;
receive a response returned from the content recognition circuitry in response to the query;
capture an application corresponding to the reproduced content on the basis of the timeline data included in the received response; and
execute the captured application in coordination with the progression time of the reproduced content.

\* \* \* \* \*